(12) United States Patent
Hayden et al.

(10) Patent No.: US 6,198,244 B1
(45) Date of Patent: Mar. 6, 2001

(54) ELECTRONIC ARCHITECTURE FOR CONTROLLING A MOTOR VEHICLE SEAT

(75) Inventors: Todd R. Hayden, Northfield; Brian D. Pasha, Cortland, both of OH (US); Philip F. Otte, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/458,743

(22) Filed: Dec. 10, 1999

(51) Int. Cl.[7] ........................................... G05B 5/00
(52) U.S. Cl. ............................. 318/466; 318/467
(58) Field of Search .................... 318/466, 467, 318/468, 101–104, 280–286, 478, 567, 568.1

(56) References Cited

U.S. PATENT DOCUMENTS

| | | | |
|---|---|---|---|
| 4,467,252 | * | 8/1984 | Takeda et al. ..................... 318/568.1 |
| 5,004,967 | * | 4/1991 | Ogasawara ............................ 318/466 |

* cited by examiner

*Primary Examiner*—Khanh Dang
(74) *Attorney, Agent, or Firm*—Richard A. Jones

(57) ABSTRACT

A vehicle seat is disclosed including a seat cushion and a seat back. The vehicle seat includes a plurality of electronic devices secured to both the seat cushion and the seat back. These electronic devices allow the occupant of the vehicle seat to control the features of the vehicle seat that are electronically modified, i.e., position, orientation, temperature, and the activation of lumbar support and/or massage devices, if any. The vehicle seat also includes a plurality of sensors associated with each of the electronic devices. Each of the sensors determines the condition or status of the electronic device to which the sensor is associated. At least one serial bus connects all of the electronic devices and sensors to a single control unit that receives all of the data from the sensors and, depending on the instructions input by the occupant of the vehicle seat, controls the electronic devices. The control unit can be integrated into the occupant position switch assembly. A smart connector is used between each of the sensors, electronic devices and the serial bus. The smart connectors retrieve the portions of the signals being transmitted over the serial bus that are to be utilized by the electronic devices. In addition, the smart connectors also allow the proper flow of data from the sensors along the serial bus to ensure the control unit receives the data.

16 Claims, 6 Drawing Sheets

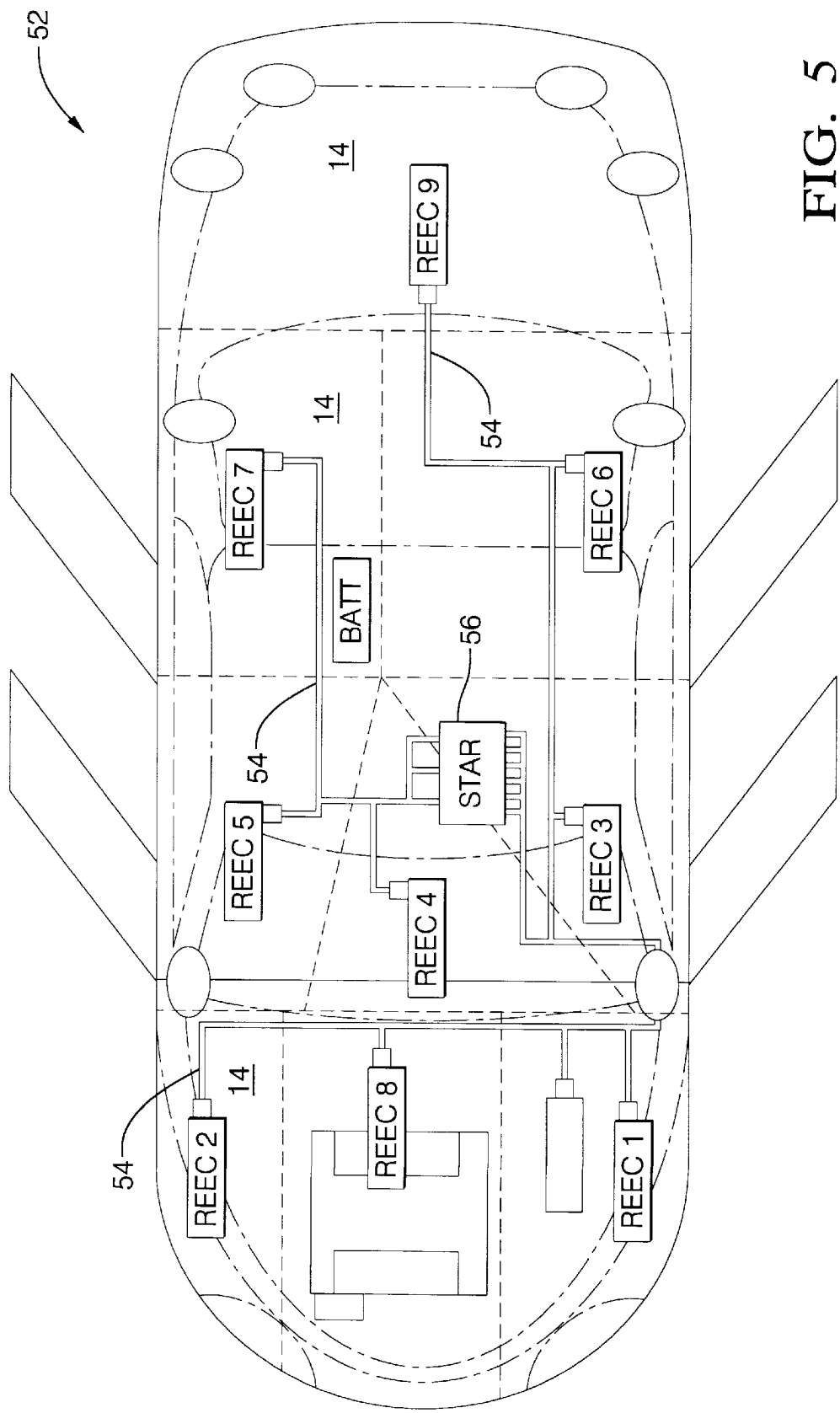

ELECTRONIC ARCHITECTURE FOR CONTROLLING A MOTOR VEHICLE SEAT

BACKGROUND OF THE INVENTION

1. Field of the Invention

The present invention relates generally to electrical and electronic system architecture and, more particularly, to an electrical and electronic system architecture for a seat of a vehicle.

2. Description of the Related Art

Vehicles, and in particular motor vehicles, contain many electrically controlled features. Many of these features are independent, while others are functionally integrated. Some of these features relate to the operation of the vehicle, including the power train and brake system, while others enhance occupant convenience, such as power seats, heated seats, remote keyless entry and automatic temperature control. Typically, the operation of these features is controlled by a functionally specific electronic controller. An example of an electronic controller is an engine controller that controls the engine and engine-related systems.

The electronic controller is typically a microprocessor having processing circuitry, input biasing and protection circuitry and output power switching capability. The electronic controller controls a function specific electrical device, such as an actuator or motor and receives data from sensors. The electrical device is electrically connected to the electronic controller with a conductor. A typical conductor is an insulated copper wire. Another type of conductor is a flexible printed circuit board. Depending on the locations of the electrical device or the electronic controller in the vehicle, a large quantity of parallel conductors, including individual wires, large bundles of wires, or flexible circuits may be routed throughout the vehicle.

As is well understood in the art, electrical/electronic system architecture refers to the organization and interrelationship of the electrical/electronic features of the vehicle. As more sophisticated electronically operated features are being utilized in vehicles, the electrical/electronic system architecture is likewise increasing in complexity. For example, a luxury-oriented vehicle could contain over thirty electronic controllers. This greatly increases the complexity and packaging requirements of the electrical/electronic system architecture. While an electrical/electronic system architecture based on functionally distributed electronic controllers worked well in the past, it is desirable to increase the flexibility given the popularity of electronically oriented features in today's motor vehicles. Thus, there is a need in the art for an electrical/electronic system architecture that is based on physically distributed electronic controllers to provide greater flexibility in the design and operation of electrical/electronic features within the vehicle.

SUMMARY OF THE INVENTION

Accordingly, the present invention is an electronic control assembly including a mechanism to be monitored and controlled by the electronic control assembly. The present invention also includes a plurality of electrical devices secured to the mechanism. Each of the electrical devices is designed to perform a specific function. The present invention also includes a plurality of sensors secured to the mechanism. The sensors provide feedback on a status of each of the electrical devices and the mechanism. A control unit receives instructions for each of the electrical devices. The control unit also receives the feedback from each of the sensors. From the instructions and feedback, the control unit creates command signals to be distributed to each of the electrical devices. A serial bus having a predetermined length is electrically connected to the electrical devices, the sensors and the control unit such that the control unit sends all of the command signals and receives all of the feedback signals over the serial bus.

One advantage of the present invention is that a mechanism, i.e., a seat assembly, is controlled remotely through the use of a control unit incorporating distributed architecture. Another advantage of the present invention is the ability to reduce the number of discrete control units from one for every feature to one for every mechanism such as a seat assembly. Still another advantage of the present invention is the ability to incorporate the use of a low cost serial bus in place of dedicated wire harnesses. Yet another advantage of the present invention is that the connections between the electrical devices and the control unit are such that a significant number of cut leads are eliminated, thus reducing costs associated with raw materials, inventory and labor during harness manufacturing. A further advantage of the present invention is that the present invention sharply reduces the volume and mass of the mechanism resulting in further economies.

Other features and advantages of the present invention will be readily appreciated as the same becomes better understood after reading the subsequent description when considered in connection with the accompanying drawings.

BRIEF DESCRIPTION OF THE DRAWINGS

FIG. 5 is a top view of the communication network and computational network for the electrical/electronic system architecture of FIGS. 1 and 4, illustrated in operational relationship with the vehicle.

DETAILED DESCRIPTION OF THE PREFERRED EMBODIMENT

Figure 1:
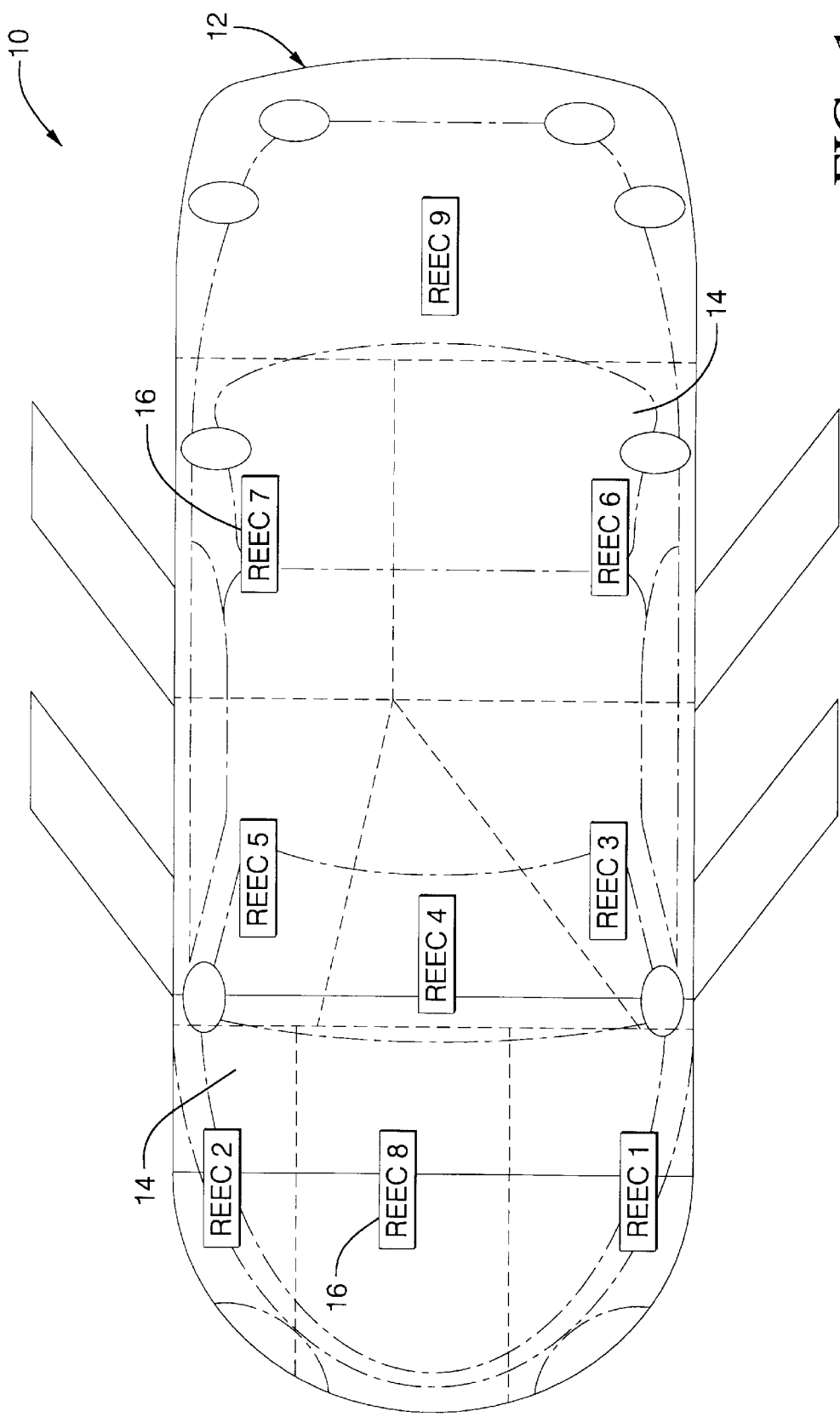
FIG. 1 is a top view of an electrical/electronic system architecture, according to the present invention, illustrated in operational relationship with a vehicle.

Referring to FIGS. 1 through 5, one embodiment of an electrical/electronic system architecture 10 is shown as environment for which the present invention is to be operating. The electrical/electronic system architecture 10 ("architecture 10") is incorporated into a vehicle 12, such as an automotive vehicle. The architecture 10 partitions the vehicle 12 into a plurality of discrete regions 14. In this example, there are nine discrete regions 14. The role of the region 14 within the architecture 10 is to facilitate regional power distribution, global and regional communication and computing. To accomplish these functions, each region 14 includes a controller 16, referred to as a regional electrical/electronic controller, or REEC. The architecture 10 includes a global communication line 54 (FIG. 5), as will be discussed. Advantageously, the REECs 16 for each region 14 are in electrical communication.

Figure 6:
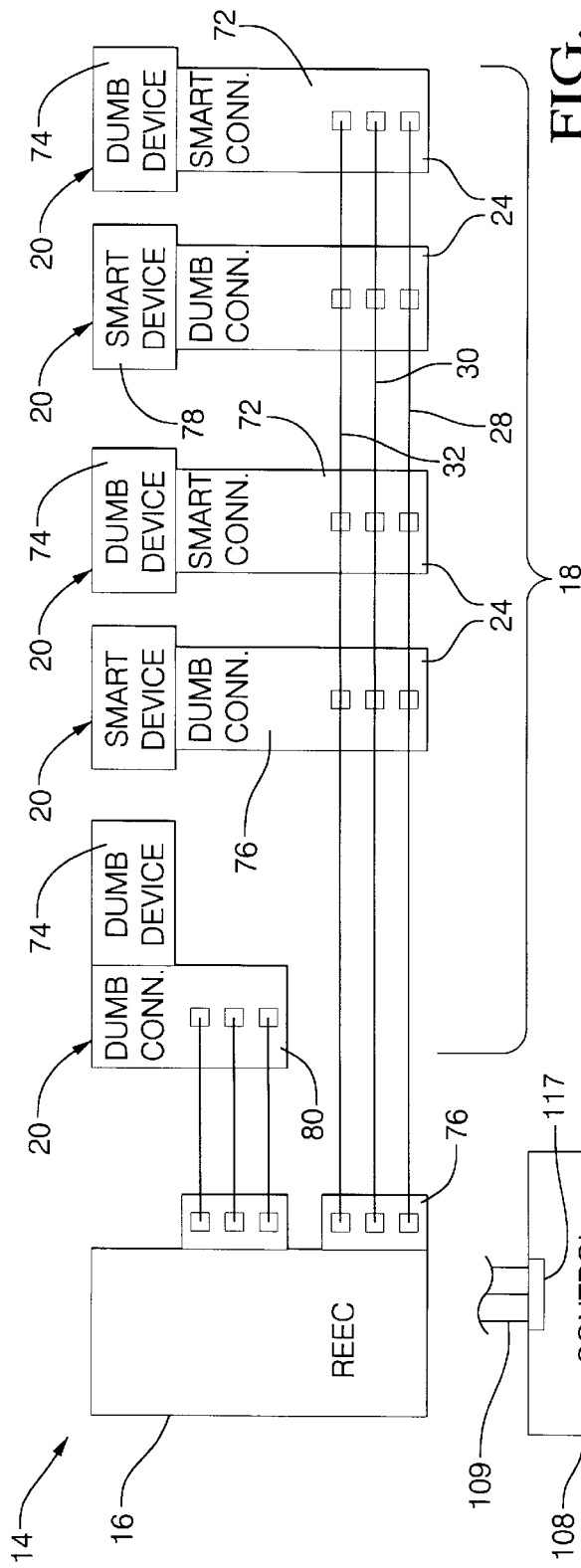
FIG. 6 is a block diagram of a multi-drop construction, according to the present invention, of the electrical/electronic system architecture of FIG. 1.

The architecture 10 may include at least one local network 18, as best illustrated in FIG. 6. The local network 18 includes electronic devices 20 such as sensors, switches, actuators or connectors. It should be appreciated that the number of local networks 18 is dependent on several factors, such as the number of features within that region 14 of the vehicle 12 that rely on electrical signals and electricity for power.

The architecture 10 may include at least one node 24. An example of a node 24 includes a switch, sensor, actuator, motor, lamp and the like that operates the feature(s) within that particular region 14. The node 24 may be part of the local network 18, or directly connected to the REEC 16 if the data rate requirements exceed the local network 18 capability. In this example, the local network 18 could contain up to ten nodes 24.

Figure 4:
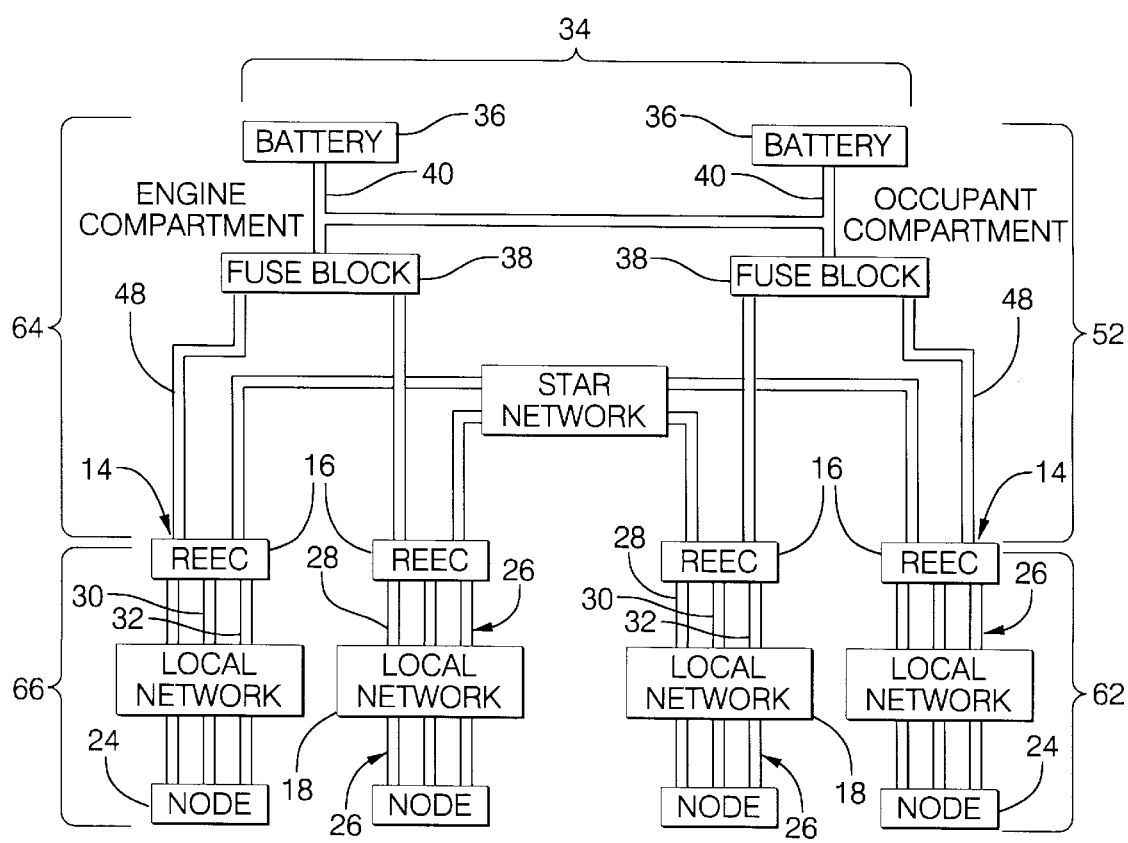
FIG. 4 is a block diagram of a communication network and computational network, according to the present invention, of the electrical/electronic system architecture of FIG. 1.

The local network 18 is electrically connected to the region 14 by a bus 26. In this example, the bus 26 includes three wires with a separate wire each for power 28, ground 30 and serial data communication 32 as illustrated in FIGS. 4 and 6. The local network 18 and corresponding nodes 24 may be connected to the bus 26 using a multi-drop construction method, to be discussed. Advantageously, each bus 26 provides bi-directional communication between each node 24 and the REEC 16. An example of a bi-directional communication protocol known in the art is a Universal Asynchronous Receiver Transmitter (UART). It should be appreciated that the bus 26 is conventional and known in the art.

There are several methods to determine how to partition the motor vehicle 12 into regions 14. In a preferred method, the number and type of features on the motor vehicle 12 determines the total number of nodes 24 required. Each node 24 may require that its data be shared with all of the regions 14 via a global communication line 54 to be discussed. However, electrical loading and response time constraints may limit the number of nodes 24 that can be placed on the bus 26; therefore, only a predetermined number of buses 26 are available for each REEC 16. Additional data about the vehicle 12 is calculated and distributed using parallel processing by each REEC 16 and is communicated to other REECs 16. The total required computational power of the architecture 10 depends on the total amount of data, as determined from the total number of nodes 24, the amount of data per node 24, calculated data, and the data communication needs. Therefore, the number of REECs 16 is determined from the total required computational power divided by the computing power capability of the REEC 16 used in each region 14.

The positioning of the REEC 16 within the region 14 can minimize wiring complexity and improve the flexibility of the architecture 10. One factor in positioning the REEC 16 is physical accessibility to the REEC 16. Another factor is how the vehicle 12 is assembled. Advantageously, the partitioning of the motor vehicle 12 into regions 14 increases the opportunity for modular assembly of the vehicle 12.

Figure 2:
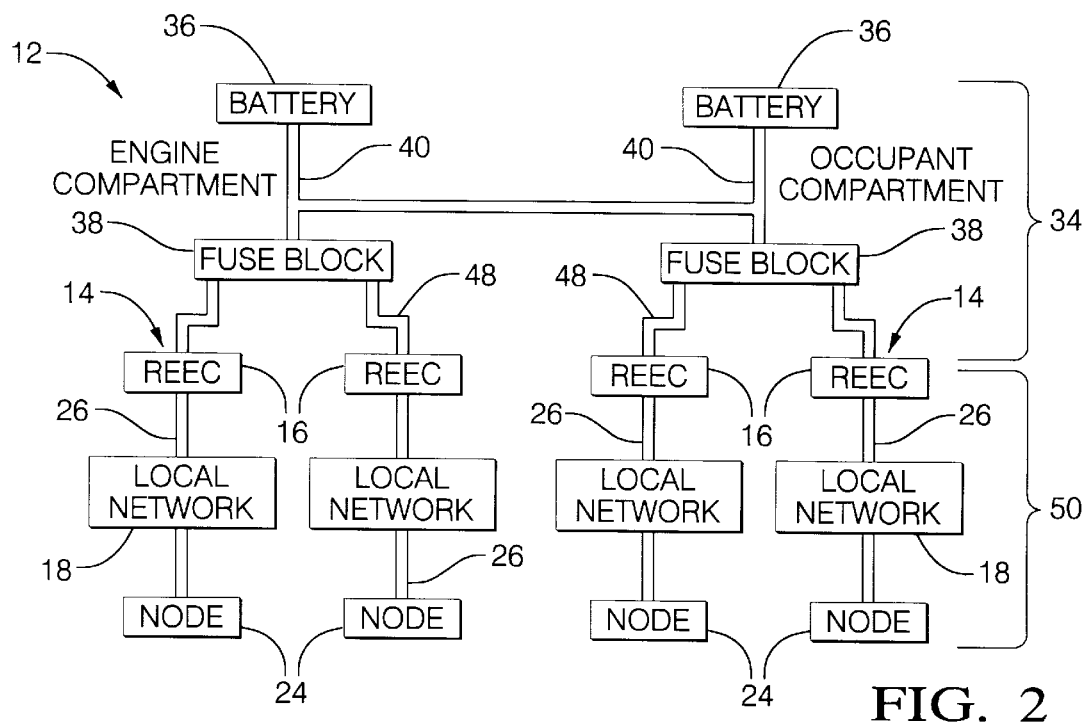
FIG. 2 is a block diagram of a power distribution network, according to the present invention, of the electrical/electronic system architecture of FIG. 1.
Figure 3:
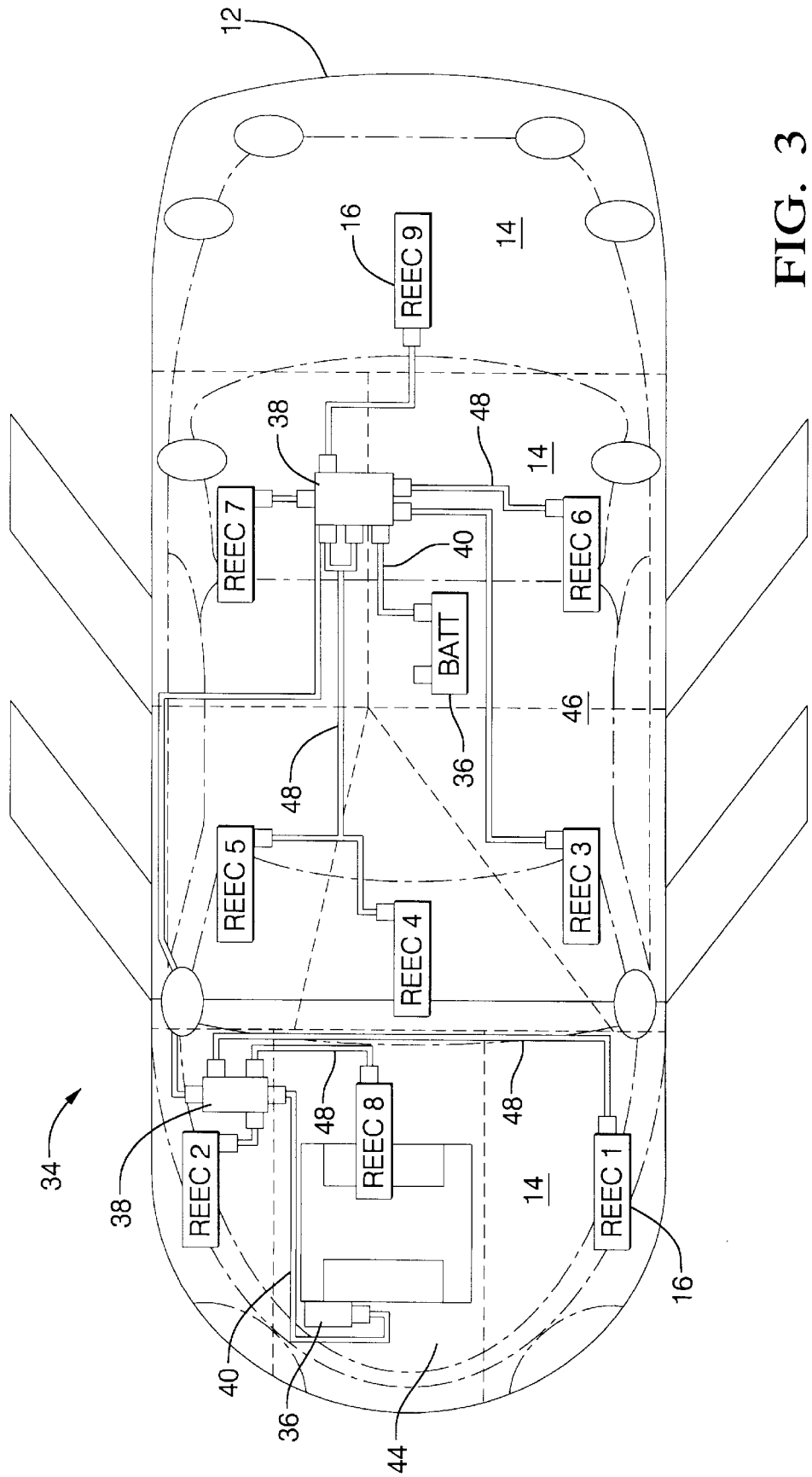
FIG. 3 is a top view of the power distribution network for the electrical/electronic system architecture of FIGS. 1 and 2, illustrated in operational relationship with the vehicle.

Referring to FIGS. 2 and 3, the architecture 10 includes a global power distribution network 34 that distributes power to all the regions 14 of the vehicle 12. The global power distribution network 34 includes a power source 36, such as a battery. It should be appreciated that there could be more than one battery. The global power distribution network 34 includes a global circuit protection device 38 and a first power feed 40. The power is transferred from the primary power source 36 to the global circuit protection device 38 by the first power feed 40, which may be a wire cable. The global circuit protection device 38 has a plurality of global circuit protection elements (not shown) operably connected to it. In this example, the global circuit protection device 38 is a fuse block and the global circuit protection element is a high current fuse, as is known in the art. Preferably, there are two fuse blocks 38, one located within the engine compartment 44 of the vehicle 12 and the other positioned within an occupant compartment 46 of the vehicle 12. The number of fuses connected to the fuse block 38 is related to the number of REECs 16, which is, in turn, related to the features on the vehicle 12. The global power distribution network 34 includes a second power feed 48 to distribute power to each region 14. The second power feed 48 interconnects the fuse block 38 and the REEC 16. It should be appreciated that in this example, a conventionally known "star" configuration (not shown) is used to electrically connect the first power feed 40 to each fuse in the fuse block 38.

Referring to FIG. 2, a power distribution network 50 for the architecture 10 is shown to accept power from the global power distribution network 34 and distributes it to the local networks 18, while also providing circuit protection for the region 14. Preferably, the REEC 16 has a regional circuit protection device (not shown), such as a second fuse block. The second fuse block has a plurality of secondary circuit protection elements (not shown), such as a fuse, operably connected to it. In addition to providing circuit protection, the regional circuit protection device feeds the power to the local networks 18 and nodes 24 via the power wire 28 on the bus 26. It should be appreciated that the number of secondary circuit protection elements is dependent on the number of buses 26 contained within the region 14.

The regional power distribution network 50 also provides for regional grounding. The local networks 18 and nodes 24 are electrically grounded to the ground wire 30 on the bus 26. The REEC 16 is then grounded, using a method such as case grounding, to a sheet metal portion of the vehicle 12.

Referring to FIGS. 4 and 5, the data communication portion of the architecture 10 is shown. A global communication network 52 provides serial communication between each region 14. The global communication network 52 includes the global communication line 54 that interconnects each region 14 to facilitate the transfer of data between regions 14. Advantageously, the data from one region 14 is shared with the other regions 14. Preferably, the global communication line 54 is a high-speed network designed to transfer large amounts of data. One type of high-speed network is a "star" network 56. For example, the star network 56 includes a star node (not shown). The star node includes a set of lines, including a transmit line (not shown) and a receive line (not shown) arranged in a star configuration. Preferably, the star network 56 includes a set of lines for each REEC 16. Data enters the star network 56 via one transmit line and is transmitted through the star to all of the receive lines. An example of a star network 56 is disclosed in commonly assigned patents entitled "Fiber Optic Star Coupler," U.S. Pat. No. 4,995,692 issued on Feb. 26, 1991 and "Fiber Optic Connector for Connecting A Fiber Optic Harness to an Optical Device," U.S. Pat. No. 5,367,595 issued on Nov. 22, 1994.

The global communication line 54 interconnecting each region 14 may be an optical wire, capable of transferring over one million bits per second of data. Another example of a global communication line 54 is a twisted pair, which includes two standard copper wires twisted together, capable of transferring approximately 200,000 bits per second of data. While in this example the REECS 16 are interconnected, it is foreseeable that a stand-alone microprocessor based module (not shown) could be connected to the global communication network 52, to access the data being transferred.

The architecture 10 also includes a regional communication network 62 that receives and transmits shared global data, and distributes data communication within the local networks 18 and the nodes 24. The regional communication network 62 communicates with the local networks 18 via the data communication wire 32 on the bus 26. Preferably, the bus 26 is low speed to minimize cost. However, depending on the data requirements, there could be a mixture of high speed and low speed data transmission buses 26 within a region. It should be appreciated that a node 24 with a high-speed data transmission requirement could be directly wired to the REEC 16.

The architecture 10 includes a global computational network 64. The global computational network 64 distributes computed data from one region 14 to the rest of the regions 14 via the global communication line 54. The architecture 10 also includes a regional computational network 66. The regional computational network 66 uses the REEC 16 within each region 14 to perform local calculations and functions based upon local inputs and outputs from the electrical/electronic features within that region 14. Global computing and functional performance may be directed by the REEC 16 within a particular region 14 or it may be requested by the REEC 16 in another region 14. An example of the flexibility of the architecture 10 is that any computation can be arbitrarily assigned to a specific REEC 16 to be performed or, in the alternative, be variable such that any available REEC 16 may perform the computation depending on the availability of any REEC 16 during vehicle operation.

Referring to FIG. 6, the local networks 18 and nodes 24 may be connected to the bus 26 using a connection method known in the art as multi-drop construction. Advantageously, multi-drop construction minimizes the hardware content of the architecture 10. The device 20, i.e., the terminal end of both the power and communications networks described above, may be categorized as one of three types, a multi-drop smart connector 72 combined with a dumb device 74; a multi-drop dumb connector 76 combined with a smart device 78; or a direct wired dumb connector 80 combined with a dumb device 74. A smart device contains electronics for more complex functions such as serial data communication or power switching. A dumb device merely receives power and possibly data and operates itself based thereon. Computational functions do not occur within a dumb device 74. It is foreseeable that a smart connector 72 can control multiple dumb devices 74. Preferably, the bus 26 is also connected to the REEC 16 using multi-drop construction 70. The connection between the bus 26 and REEC 16 can be a dumb connector 76 since the REEC 16 is a smart device 78.

Another example of the flexibility of the architecture 10 is that regional computing and functional performance may be dedicated within a particular region 14. With regard to a seat system 102, discussed subsequently, the local network 18 includes a switch to control a position of the seat and a seat motor. If the switch is energized, this information is communicated to a smart seat switch assembly (SSSA) or control unit 108, discussed subsequently, along the bus 26. The control unit 108 then determines the desired seat movement and communicates that functional movement to the seat motor via the bus 26. This locally specific activity takes place solely within one region 14, and requires minimal input from another region 14.

Figure 8:
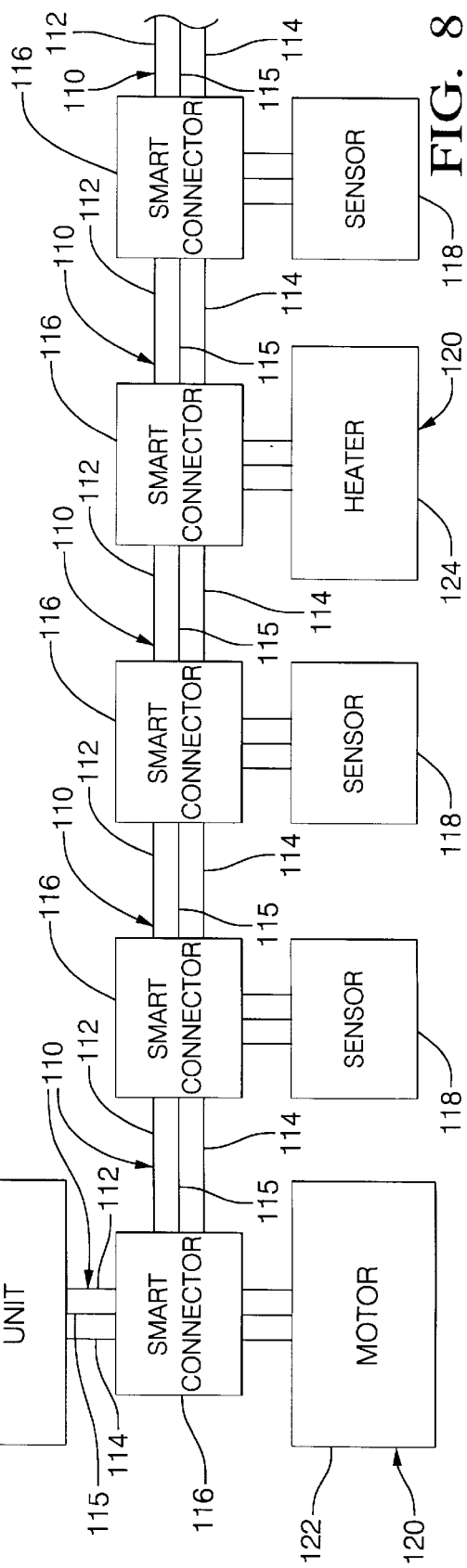
FIG. 8 is a block diagram of one embodiment of the present invention.
Figure 7:
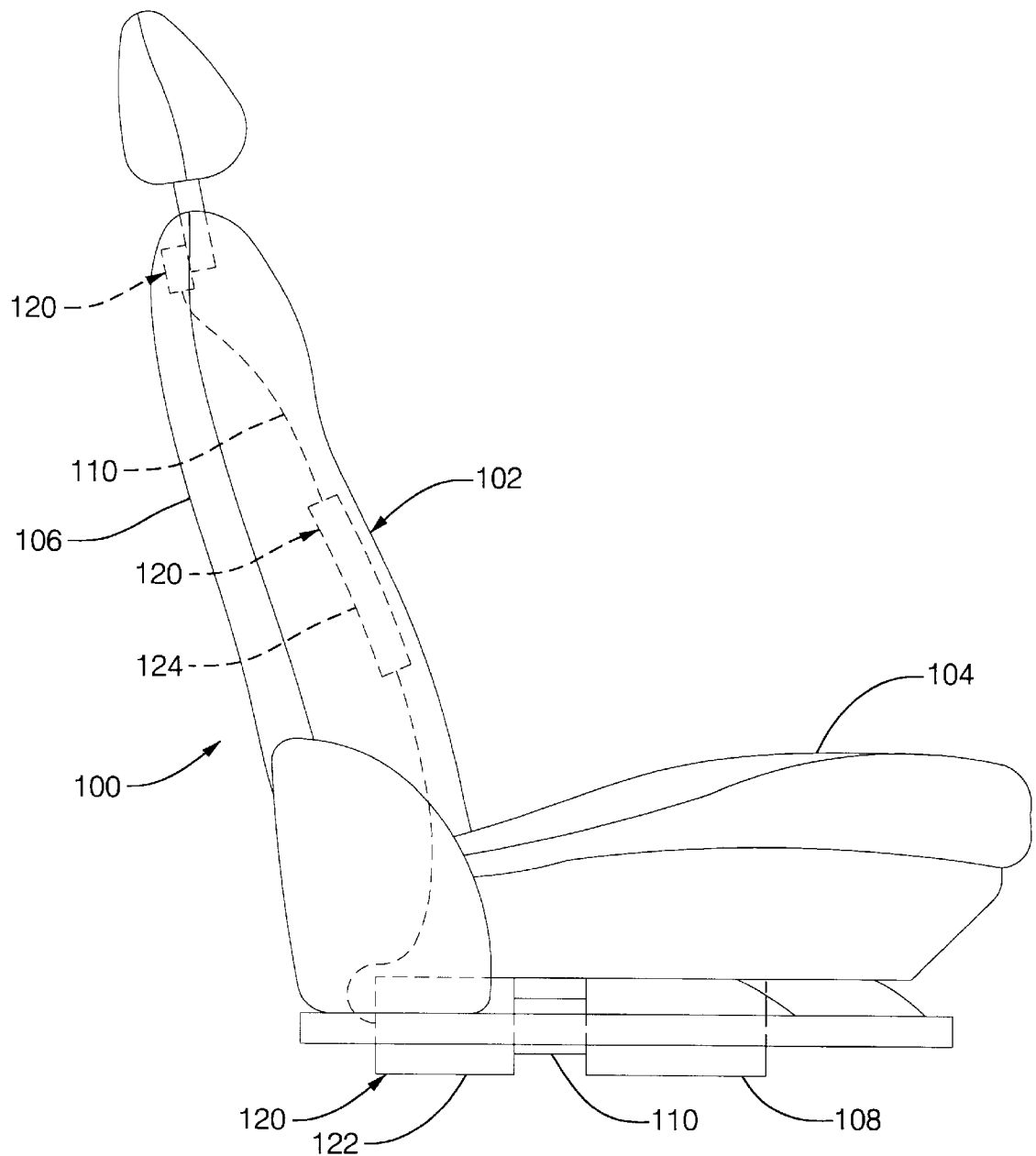
FIG. 7 is a perspective view of a vehicle seat incorporating the present invention.

Referring to FIGS. 7 and 8, an embodiment of the present invention is generally indicated at 100 for a vehicle seat 102. This embodiment 100 is an electronic control assembly and is incorporated into a vehicle seat 102 having a seat cushion 104 and a seat back 106. It should be appreciated by those skilled in the art that the vehicle seat 102 is merely a host mechanism and that any other mechanism found within a vehicle may utilize this embodiment 100 or one similar thereto.

The embodiment 100 includes a control unit 108. This control unit 108 is the SSSA and receives data from an input harness 109. Attached to the control unit 108 is a serial bus 110. Again, as discussed above, the serial bus 110 is capable of transmitting and receiving signals through signal wire or conductor 112 and power through a power wire or conductor 114. A third ground wire or conductor 115 is used to ground the electronic control assembly 100. Unlike the REEC discussed above, the control unit 108 does not receive or manipulate the power from the power wire 114. The control unit 108 does include a port 117 to provide a connection of convenience to have the power from the input harness 109 enter the serial bus 110. The control unit 108 does not receive or affect the power.

The control unit 108 and serial bus 110 utilize the multi-drop technology allowing for the elimination of controllers for each electrical feature. The multi-drop technology utilizes smart connectors 116 to facilitate the proper communication between the control unit 108 and the sensors 118 and the electrical devices 120 and the control unit 108. More specifically, the smart connectors 116 understand which portions of the signals being transmitted over the serial bus 110 are to be retrieved and acted upon by the smart connectors 116 and to transmit the status of the sensors 118 or activate or deactivate the electrical devices 120 associated therewith and which portions are to be left alone to be retrieved by another smart connector 116 or the control unit 108. While the smart connectors 116 are shown as separate elements in FIG. 8, the smart connectors 116 could be designed to be fully integrated into the individual sensors 118 and electrical devices 120. Further, because a sensor 118 is typically disposed adjacent an electrical device 120, the smart connectors 116 could be designed to handle the electrical device 120 and the sensor 118 sensing that particular electrical device 120.

The serial bus 110 has a predetermined length. This length is minimized to reduce losses in the communication of signals and the transmission of power. Attached to the serial bus 110 along the length thereof is a plurality of sensors 118. These sensors 118 sense various parameters of the vehicle seat 102 to determine if action is to be taken with regard to adjusting those measured parameters. A non-exhaustive list of parameters to be measured with respect to a vehicle seat 102 include, but are not limited to, seat back orientation, seat cushion position and orientation, lumbar support effort and position, temperature, and the like. These sensors 118 are known in the art.

Also attached to the serial bus 110 is a plurality of electrical devices 120 similar to the nodes 24, discussed above. An electrical device 120 may be a motor 122 or a heater 124. It may be appreciated by those skilled in the art that any electrical device may be attached to the serial bus 110 to receive power and communications from the control unit 108 to operate or change the condition or status of a mechanism other than a vehicle seat 102.

In the instance of the motor 122, it is desirable to locate the motor 122 as close to the control unit 108 as possible. In addition, the serial bus 110 is routed such that as little serial bus 110 as possible extends between the control unit 108 and the motor 122. This reduces the length or amount of serial bus 110 across which noise generated by the motor 122 is being transmitted which, in turn, reduces the number of sensors 118 and other electrical devices 120 being affected by the operation of the motor 122.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An electronic architecture for conrolling a vehicle seat, said seat comprising:

a seat cushion;

a seat back mounted to said seat cushion;

a plurality of electronic devices secured to said seat cushion and said seat back, each of said plurality of electronic devices being designed to perform a specific function;

a plurality of sensors secured to said seat cushion and said seat back providing feedback on a status of each of said plurality of electronic devices and said seat back and said seat cushion; and a control unit for receiving instructions for each of said plurality of electronic devices and for receiving the feedback from each of said plurality of sensors, said control unit creating command signals to be distributed to each of said plurality of electronic devices;

and the architecture comprising at least one serial bus having a predetermined length electrically connecting said plurality of electronic devices and said plurality of sensors to said control unit such that said control unit sends all of the command signals and receives all of the feedback signals over said serial bus; and a plurality of smart connectors electrically connected between said serial bus and each of said plurality of electronic devices and between said serial bus and each of said plurality of sensors to transmit communication signals from said control unit to each of said plurality of electronic devices and to transmit communication signals from each of said plurality of sensors to said control unit bi-directionally over said serial bus.

2. An electrical architecture for controlling a vehicle seat as set forth in claim 1 wherein said serial bus provides power and data to each of said plurality of electronic devices and each of said plurality of sensors.

3. An electrical architecture for controlling a vehicle seat as set forth in claim 2 wherein said plurality of electronic devices and said plurality of sensors are intermixed along said length of said serial bus.

4. An electrical architecture for controlling a vehicle seat as set forth in claim 3 wherein a portion of the plurality of electronic devices includes at least one motor.

5. An electrical architecture for controlling a vehicle seat as set forth in claim 4 wherein said motor is located along said length of said serial bus proximate to said control unit.

6. An electrical architecture for controlling a vehicle seat as set forth in claim 5 wherein each of said plurality of sensors is electrically connected to said serial bus along said length adjacent each of said electronic devices creating a condition being sensed by each of said plurality of sensors.

7. An electrical architecture for controlling a vehicle seat as set forth in claim 1 wherein said control unit includes a port for receiving a vehicle harness including a power conductor and a ground conductor such that said port connects the power conductor and the ground conductor to each of said plurality of electrical devices.

8. An electronic control assembly comprising:

a mechanism to be monitored and controlled by said electronic control assembly;

a plurality of electronic devices adapted to be secured to a mechanism to be monitored and controlled by said electronic control assembly, each of said plurality of electronic devices being designed to perform a specific function;

a plurality of sensors adapted to be secured to said mechanism providing feedback on a status of each of said plurality of electronic devices and said mechanism;

a control unit for receiving instructions for each of said plurality of electronic devices and for receiving the feedback from each of said plurality of sensors, said control unit creating command signals to be distributed to each of said plurality of electronic devices; and a serial bus having a predetermined length electrically connecting said plurality of electronic devices and said plurality of sensors to said control unit such that said control unit sends all of the command signals and receives all of the feedback signals over said serial bus.

9. An electronic control assembly as set forth in claim 8 wherein each of said plurality of electronic devices and each of said plurality of sensors is connected to said serial bus using a smart connector.

10. An electronic control assembly as set forth in claim 9 wherein said serial bus provides power and data to each of said plurality of electronic devices and each of said plurality of sensors.

11. An electronic control assembly as set forth in claim 10 wherein said plurality of electronic devices and said plurality of sensors are intermixed along said length of said serial bus.

12. An electronic control assembly as set forth in claim 11 wherein a portion of the plurality of electronic devices includes at least one motor.

13. An electronic control assembly as set forth in claim 12 wherein said motor is located along said length of said serial bus proximate to said control unit.

14. An electronic control assembly as set forth in claim 13 wherein each of said plurality of sensors is electrically connected to said serial bus along said length adjacent each of said electronic devices creating a condition being sensed by each of said plurality of sensors.

15. A method for controlling a mechanism using a control unit, a serial bus, a plurality of sensors and a plurality of electronic devices to act on the mechanism, the method comprising the steps of:

electrically connecting the serial bus to the control unit;

electrically connecting each of the plurality of sensors and each of the plurality of electronic devices to the serial bus in series; and arranging the serial bus, the plurality of sensors and the plurality of electronic devices such that the length of the serial bus is as short as required to operate the mechanism.

16. A method as set forth in claim 15 wherein the step of arranging further includes the step of positioning any of the plurality of electronic devices having motors in close proximity to the control unit.

* * * * *